United States Patent
Bortone

(10) Patent No.: US 7,157,039 B2
(45) Date of Patent: *Jan. 2, 2007

(54) METHOD AND APPARATUS FOR PRODUCING A CURLY PUFF EXTRUDATE

(75) Inventor: Eugenio Bortone, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 10/729,131

(22) Filed: Dec. 5, 2003

(65) Prior Publication Data

US 2004/0089968 A1    May 13, 2004

Related U.S. Application Data

(62) Division of application No. 09/952,574, filed on Sep. 10, 2001, now Pat. No. 6,722,873.

(51) Int. Cl.
B29C 47/00    (2006.01)
B29C 53/00    (2006.01)

(52) U.S. Cl. ............... 264/503; 264/555; 264/167; 264/210.2

(58) Field of Classification Search ............... None
See application file for complete search history.

(56) References Cited

U.S. PATENT DOCUMENTS

| | | |
|---|---|---|
| 1,824,482 A | 9/1931 | Hartmann |
| 3,327,461 A | 6/1967 | Wyatt |
| 3,846,082 A | 11/1974 | Labelle, Jr. et al. |
| 4,097,213 A | 6/1978 | McComb et al. |
| 4,233,259 A | 11/1980 | Pietratus et al. |
| 4,288,463 A | 9/1981 | Groff et al. |
| 4,290,989 A | 9/1981 | Topor et al. |
| 4,327,050 A | 4/1982 | Salmon |
| 4,522,773 A | 6/1985 | Menezes et al. |
| 4,698,004 A | 10/1987 | Ramnarine |
| 4,772,347 A | 9/1988 | Fowler |
| 4,803,091 A | 2/1989 | Mottur et al. |
| 4,879,126 A | 11/1989 | Willard et al. |
| 4,888,192 A | 12/1989 | Ramnarine |
| 5,246,651 A | 9/1993 | Hentschel |
| 5,266,260 A | 11/1993 | Hentschel |
| 5,641,529 A | 6/1997 | Kunas |
| 5,670,185 A | 9/1997 | Heck et al. |
| 5,725,814 A * | 3/1998 | Harris ............... 264/40.3 |
| 5,888,567 A | 3/1999 | Daouse |
| 6,066,288 A * | 5/2000 | Purstinger ............... 264/568 |
| 6,086,352 A | 7/2000 | McFarland |
| 6,287,102 B1* | 9/2001 | Franz et al. ............... 425/71 |
| 6,428,830 B1 | 8/2002 | Matthews et al. |
| 6,558,727 B1* | 5/2003 | Degady et al. ............... 426/516 |
| 6,582,643 B1* | 6/2003 | Brunnhofer ............... 264/177.17 |
| 6,607,772 B1* | 8/2003 | Bortone ............... 426/516 |
| 6,680,022 B1* | 1/2004 | Meier-Kaiser ............... 264/568 |
| 6,722,873 B1* | 4/2004 | Bortone ............... 425/319 |

(Continued)

*Primary Examiner*—Mark Eashoo
(74) *Attorney, Agent, or Firm*—Carstens & Cahoon, LLP; Colin P. Cahoon; Christopher P. O'Hagan

(57) ABSTRACT

A process and apparatus for the production of a spiral or coil shaped puffed extrudate. A tube or other peripheral containment vessel is placed at the exit end of an extruder die. A force or resistance is then applied on the extrudate downstream of the glass transition point, thereby causing the extrudate to back up and coil in the containment vessel.

15 Claims, 3 Drawing Sheets

U.S. PATENT DOCUMENTS 6,770,233 B1* 8/2004 Bortone et al. ............. 264/167
6,797,213 B1* 9/2004 Bortone et al. ............. 264/143
2005/0019467 A1* 1/2005 Bortone et al. ............. 426/516
2005/0034581 A1* 2/2005 Bortone et al. ............... 83/469

* cited by examiner

METHOD AND APPARATUS FOR PRODUCING A CURLY PUFF EXTRUDATE

CROSS-REFERENCE TO RELATED APPLICATION

This application is a divisional of U.S. application Ser. No. 09/952,574, now U.S. Pat. No. 6,722,873 entitled "Method and Apparatus for Producing a Curly Puff Extrudate" and filed on Sep. 10, 2001, which is hereby incorporated herein by reference.

BACKGROUND OF THE INVENTION

1. Technical Field

The present invention relates to the production of a spiral shaped puff extrudate and, in particular, to confining the extrudate in a tube or like peripheral containment vessel while applying a force or resistance on the extrudate downstream of the extrudate's glass transition point. The downstream force or resistance causes the otherwise linear extrudate to "back-up" into the containment vessel, thus coiling into the spiral or curl shape.

2. Description of Related Art

The production in the prior art of a puffed extruded product, such as snacks produced and marketed under the Cheetos™ brand label, typically involves extruding a corn meal or other dough through a die having a small orifice at extremely high pressure. The dough flashes or puffs as it exits the small orifice, thereby forming a puff extrudate. The typical ingredients for the starting dough may be, for example, corn meal of 41 pounds per cubic foot bulk density and 12 to 13.5% water content by weight. However, the starting dough can be based primarily on wheat flour, rice flour, soy isolate, soy concentrates, any other cereal flours, protein flour, or fortified flour, along with additives that might include lecithin, oil, salt, sugar, vitamin mix, soluble fibers, and insoluble fibers. The mix typically comprises a particle size of 100 to 1200 microns.

The puff extrusion process is illustrated in FIG. 1, which is a schematic cross-section of a die 12 having a small diameter exit orifice 14. In manufacturing a corn-based puffed product, corn meal is added to, typically, a single (i.e., American Extrusion, Wenger, Maddox) or twin (i.e., Wenger, Clextral, Buhler) screw-type extruder such as a model X 25 manufactured by Wenger or BC45 manufactured by Clextral of the United States and France, respectively. Using a Cheetos like example, water is added to the corn meal while in the extruder, which is operated at a screw speed of 100 to 1000 RPM, in order to bring the overall water content of the meal up to 15% to 18%. The meal becomes a viscous melt 10 as it approaches the die 12 and is then forced through a very small opening or orifice 14 in the die 12. The diameter of the orifice 14 typically ranges between 2.0 mm and 12.0 mm for a corn meal formulation at conventional moisture content, throughput rate, and desired extrudate rod diameter or shape. However, the orifice diameter might be substantially smaller or larger for other types of extrudate materials.

While inside this small opening 14, the viscous melt 10 is subjected to high pressure and temperature, such as 600 to 3000 psi and approximately 400° F. Consequently, while inside the small orifice 14, the viscous melt 10 exhibits a plastic melt phenomenon wherein the fluidity of the melt 10 increases as it flows through the die 12.

It can be seen that as the extrudate 16 exits the orifice 14, it rapidly expands, cools, and very quickly goes from the plastic melt stage to a glass transition stage, becoming a relatively rigid structure, referred to as a "rod" shape if cylindrical, puffed extrudate. This rigid rod structure can then be cut into small pieces, further cooked by, for example, frying, and seasoned as required.

Any number of individual dies 12 can be combined on an extruder face in order to maximize the total throughput on any one extruder. For example, when using the twin screw extruder and corn meal formulation described above, a typical throughput for a twin extruder having multiple dies is 2,200 lbs., a relatively high volume production of extrudate per hour, although higher throughput rates can be achieved by both single and twin screw extruders. At this throughput rate, the velocity of the extrudate as it exits the die 12 is typically in the range of 1000 to 4000 feet per minute, but is dependent on the extruder throughput, screw speed, orifice diameter, number of orifices and pressure profile.

As can be seen from FIG. 1, the snack food product produced by such process is necessarily a linear extrusion which, even when cut, results in a linear product. Consumer studies have indicated that a product having a similar texture and flavor presented in a "curl," "spiral," or "coil spring" shape (all of which terms are used synonymously by Applicant herein) would be desirable. An example of such spiral shape of such extrudate is illustrated in FIG. 2, which is a perspective view of one embodiment of a spiral or curl shaped puffed extrudate 20. The embodiment illustrated in FIG. 2 is an extrudate with a relatively tight pitch, short diameter, and cut at approximately four turns or spirals. It should be understood that when referring to a curl, spiral, or coil spring shaped puffed extrudate, however, Applicant intends that the pitch (which can be a left hand or right hand pitch) and diameter of the curl or spiral in addition to the rod (or other shape) diameter and piece length can each vary independently to provide a wide variety of products. Unfortunately, the high volume process described above provides unique challenges in producing such shape 20.

The usual method for imparting a spiral shape in an extrudate, such as with spiral shaped pasta, involves forcing the dough through a spiral shaped die orifice. As can be readily understood, such solution would not work with a puffed product that is in a plastic melt stage inside the die and produced at the velocity described above, since the product would have no memory of the imparted spiral shape upon exiting the die. In fact, it has been found that it is extremely difficult to meaningfully manipulate the melt as it passes through the die in order to induce an extrudate to wind in free space, by, for example, a temperature differential from one side of the die to the other, without substantially reducing the flow rate of the melt through the die.

Another prior art method for imparting twists or curls in the dough involves using an extruder with rotating nozzles. This process, however, is only viable when the extrudate retains a very pliable form. Further, extrusion by way of rotating nozzles typically, again, requires a greatly reduced throughput rate as compared with the relatively high volume production desirable with the prior art linear products.

To further complicate the matter, a larger surface area is required on the extruder face for the same number of individual dies when extruding a curled product versus a linear product, since the space between each die as between a linear product and a curled product must necessarily be increased to allow for the diameter of the spiral. By way of example, an extruder face may under prior art conditions accommodate 28 individual dies running at 80 lbs. per hour per each die, thereby producing a 2,240 lb. per hour throughput for the entire extruder. In order to theoretically produce the curl shaped extrudate 20 shown in FIG. 2, the same extruder face might only accommodate, for example, 4 individual dies. By way of further example, if it is necessary to slow the throughput rate to less than 30 lbs. per hour per die in order to impart some spiral shape on the extrudate by manipulating the melt inside the die, this reduces the total throughput for that extruder to only 120 lbs. per hour. Thus, by converting an extruder to manipulate the melt inside the die and imparting a spiral shape, the extruder maintains only about 5% of the throughput rate as compared to the standard linear production, even though the throughput for each individual die is reduced to about 38% of the previous throughput rate. The problem becomes even more pronounced if the extrudate throughput is reduced to even lower levels.

It can be easily understood that any prior art solution that requires the substantial reduction in the throughput of the extrudate, therefore, is not an acceptable alternative when, for example, twenty extruders must be used to match the throughput of a single extruder when compared with a linear production line. Forcing the extrudate into some spiral shaped former upon exiting the die is also not practical due to the brittle consistency of the extrudate after it drops below its glass transition temperature. Also, such spiral shaped former could become easily clogged, thereby requiring stopping the entire production line.

Consequently, a need exists for developing a method and apparatus that can impart a spiral or curl shape in a puff extrudate while also maintaining an efficient throughput rate of the product through the extruder. Ideally, such invention should be readily adaptable to existing extruders and dies, require little or minimal modification to such equipment, allow for traditional face cutting, and introduce as few collateral processing issues as possible when integrated into the overall production line.

SUMMARY OF THE INVENTION

The proposed invention comprises introducing the extrudate as it exits the extruder die into a containment tube or other peripheral containment vessel that is generally axially oriented with the flow path of the extrudate and has a diameter that approximates the intended diameter of each curl. A slight pressure, force, or resistance is then applied on the extrudate downstream of the glass transition point. This resistance causes the extrudate to "back up" and, in essence, coil inside the peripheral containment vessel.

The resistance can be accomplished by any number of means. For example, a blocking element can be placed in front of the containment tube, either outside of or integral to the tube. A hole can be drilled in the containment tube and either a pressure applied or a vacuum applied through such hole, either of which need only be of such magnitude to effect a change in the resistance on the extrudate sufficient to begin the coiling process. A blocking flap under spring tension can also be used, or any number of small obstructions or means of applying a force on the extrudate.

Such a device can be easily fitted to the exit of an extruder die at one end and to a circular extruder face at the other end, thereby allowing for a simple and inexpensive retrofit to existing machinery and allowing for face cutting. Changes in the containment vessel and changes in the method of applying resistance can be used to adjust the pitch and diameter of the curl. Economically high throughput rates can be achieved, thus allowing for efficient utilization of existing extruder production lines without requiring additional extruders to maintain line production rates.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
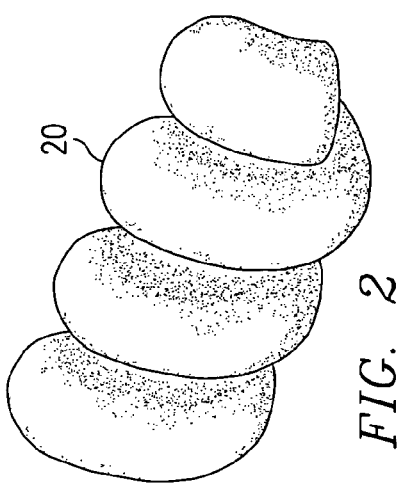
FIG. 1 is a schematic cross-section of a prior art puff extrudate die.
Figure 2:
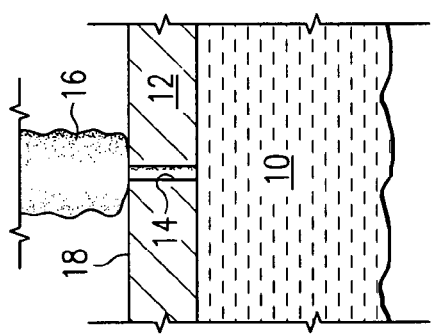
FIG. 2 is a perspective view of one embodiment of the desired puff extrudate product.
Figure 3:
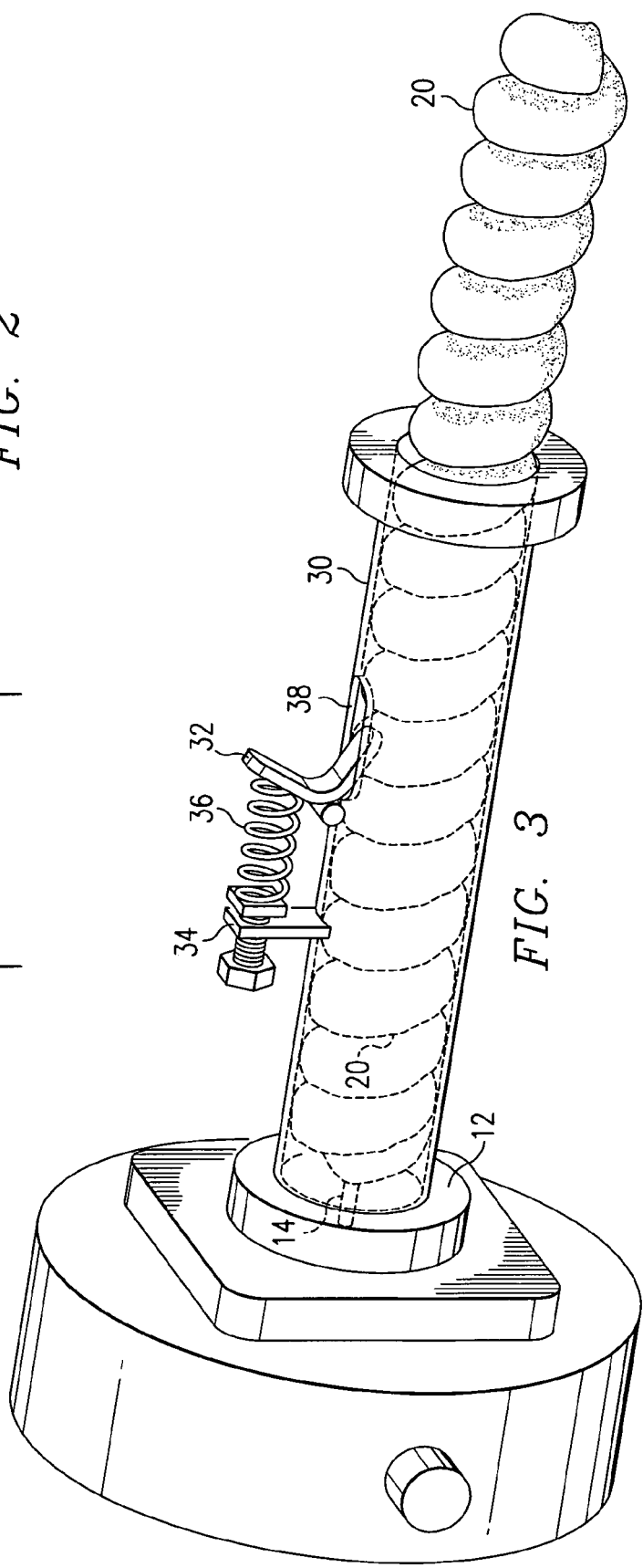
FIG. 3 is a perspective view in elevation of one embodiment of the present invention.

FIG. 3 is a perspective view in elevation of one embodiment of the invention which also shows the extrudate 20 in phantom inside the containment tube 30. Corresponding reference numerals are used to represent corresponding elements throughout the figures shown in this application unless otherwise indicated.

The extrudate 20 exits the small orifice 14 of the die 12 in the same manner as described in the prior art. Again, the diameter of the orifice 14 is dependent on the specific dough formulation, throughput rate, and desired rod (or other shape) diameter, but is preferred in the range of 1 mm to 14 mm. (The orifice 14 diameter is also dependent on the mean particle size of the corn meal or formula mix being extruded.) The tube 30 is shown centered over the orifice 14 and axially oriented with the extrudate flow. However, it should be understood that the tube 30 could be off-center from the orifice 14 and canted some degrees from an axial orientation. It should also be understood that the orifice 14 need not be circular, but could be any number of shapes, such as star shaped, hexagonal, square, etc. . .

If no force or resistance were applied to extrudate 20, it would proceed down the length of the containment tube 30 in a straight rod or linear formation, as with the prior art. However, in the embodiment shown in FIG. 3, a spring loaded flapper 32 provides a slight, and oscillating, resistance on the extrudate 20 at some point downstream of the glass transition point for the extrudate 20. As used herein, the glass transition point is that point where the extrudate turns from a liquid or plastic phase to solid or glassy phase after puffing out of the orifice 14, thereby resulting in a relatively brittle end product. The glass transition point is generally very close to the exit of the orifice 14, and is certainly within a few millimeters of such point during the production of the example corn products previously described herein. This slight resistance applied downstream of the glass transition point causes the extrudate 20 to seek the path of least resistance and begin backing up into the containment tube 30 until forming the coils illustrated, thereby adapting the circular shape of the containment tube 30. Consequently, the velocity of the extrudate 20 in the direction of tube 30 opening is reduced.

The pitch of the spiral can be controlled by adjusting the force applied on the extrudate by the flapper 32. In the embodiment shown, this is accomplished by an adjustment means 34 which controls the tension on a spring 36. The spring 36, which can be a compression spring, extension spring or any number of actuators, both mechanical and electrical, in turn pushes the flapper 32 into a cavity 38 cut into the containment tube 30.

The flapper 32 arrangement with the cavity 38 provides the additional benefit of allowing exhausting of excess water or steam out of the containment tube 30. Further, the spring loaded flapper 32 provides a means for applying resistance to the extrudate 20 while also allowing for clearing of the containment tube 30 in the event of excess extrudate buildup.

As with the other embodiments shown, the diameter of the tube 30 can vary depending on the diameter of the curl that is desired. Typically, an inside diameter of the tube 30 between 0.5 inch and 4 inch is preferable. The length of the tube 30 is not critical, as long as it allows for the application of the resistance described sufficiently downstream of the glass transition point to produce the coiling effect. Tubes having an overall length of 0.75 inch to 12 inches have been found to be acceptable.

Figure 4:
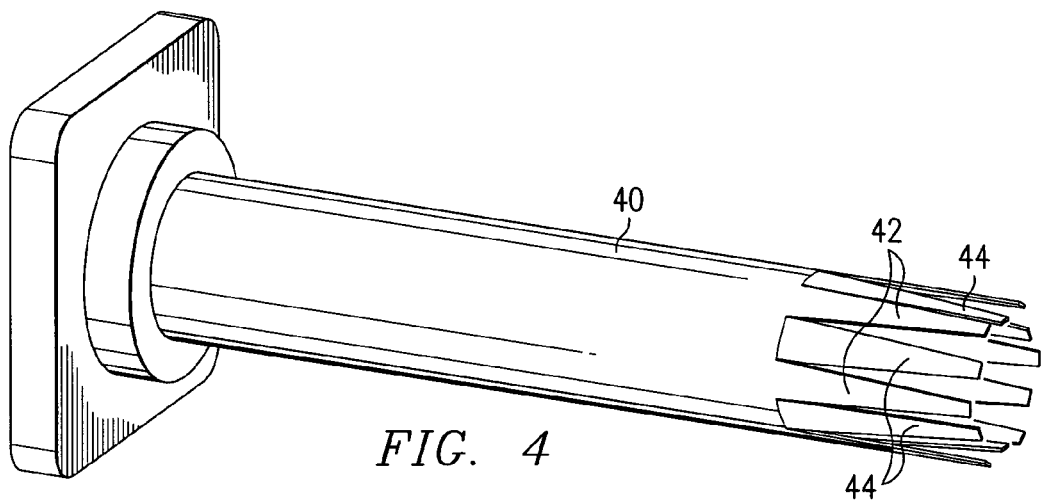
FIG. 4 is a perspective view in elevation of an alternative embodiment of the present invention.

Another embodiment of the present invention is found in FIG. 4, which shows a containment tube 40 with alternating tines 42, 44 at the exit end of the tube 40. Half of the tines 42 are merely parallel extensions of the tube 40. The other half of the tines 44 are bent slightly inward, thereby providing the resistance necessary to begin the curling of the extrudate within the containment tube 40.

Figure 5:
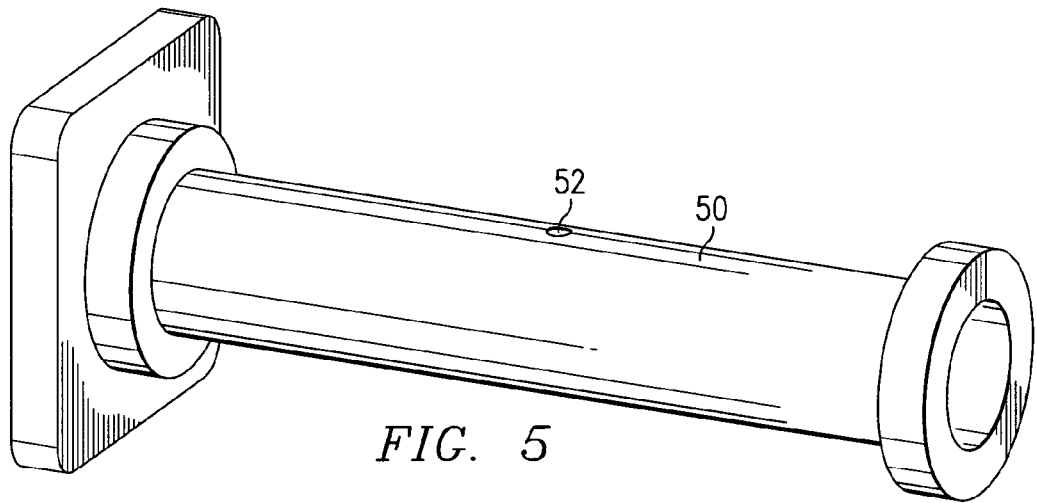
FIG. 5 is a perspective view in elevation of an alternative embodiment of the invention.

FIG. 5 shows another embodiment of the present invention incorporating a small orifice 52 cut into the containment tube 50. Pressurized air or, alternatively, a vacuum may be introduced at the orifice 52. The differential pressure thereby produced is sufficient to again cause enough resistance within the containment tube to cause the extrudate to curl within the tube 50. For example, at a throughput rate of 300 lbs. per hour using a die orifice diameter of 2.0 mm and tube 50 diameter of 1 inch, the introduction of a pressure in the range of 5 to 100 psig or a vacuum in the range of −0.5 torr to −258.5 torr have both been found effective in producing the desired phenomenon.

Figure 6:
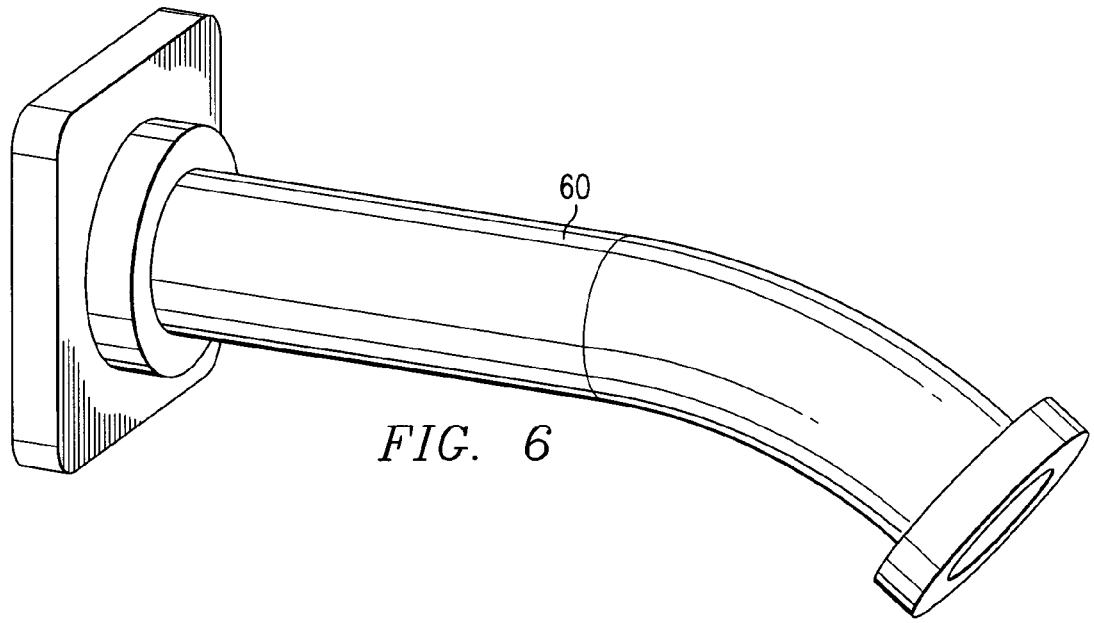
FIG. 6 is a perspective view in elevation of an alternative embodiment of the invention.

FIG. 6 shows another alternative embodiment to the proposed invention involving a curved containment tube 60. The curve or bend found downstream on the containment tube 60 again creates the desired resistance on the extrudate required to begin the curling within the containment tube 60. Depending on the throughput rate of the extrudate and the physical proportions of the extrudate, a curve in the containment tube of anywhere from 2° to 90° has been demonstrated to produce the desired effect. The same effect can be achieved using a straight tube axially canted slightly from the extrudate flow path, such that the initial contact of the extrudate with the inner wall of the tube provides the resistance required.

It should be understood that the various embodiments shown in FIGS. 3–6 are provided merely as examples of means by which a downstream resistance or pressure can be applied to the extrudate while such extrudate is bound by a containment tube or other peripheral containment vessel. Any number of shapes of containment vessels can be used, such as a containment vessel having rectangular, square, oval, or triangular sidewalls as opposed to a circular tube. The use of a square or triangular containment vessel typically produces a spiral similar to that produced by a round containment vessel. An oval containment vessel can produce a curled product that generally adopts the overall oval shape of the vessel. The containment vessel need not be a continuous enclosure. For instance, it can also consist of a plurality of members, such as rod shaped members, which generally form the skeleton or wire frame shape of a continuous-walled containment vessel, such as a pipe.

It should be understood that using the same principles previously disclosed, a rectangular containment vessel can be used having a width only slightly larger than the diameter of the extrudate to produce a sinusoidal shaped extrudate as opposed to a curly extrudate. When a resistance is applied to an extrudate in such containment vessel, a sinusoidal shape is formed, as the extrudate oscillates back and forth within the narrow rectangular shape. The wavelength of this sinusoidal shape can be varied depending on the resistance applied and the velocity of the extrudate. The height or amplitude of the sinusoidal shape is approximately one-half the interior height of the rectangular containment vessel.

Regardless of the shape of the containment vessel used, any number of means of applying the resistance can also be used, including the introduction of any physical resistance or any other means to redirect the extrudate stream sufficient to cause the extrudate to back up inside the containment tube or peripheral containment vessel. An area of increased resistance in a straight tube, for example, could produce the desired effect. The resistance need not be applied from a point within the containment vessel, but can be applied outside the containment vessel as well.

It has been found that traditional throughput rates through existing dies may be maintained using any of the embodiments illustrated and discussed above. In fact, throughput rates in excess of traditional extrusion throughputs, for example in the range of 400 lbs. per hour through a 2.0 mm diameter die, have been achieved while still maintaining the continuous curls flowing from each containment tube. Consequently, a lesser number of extruder dies can be used to accommodate the spiral diameter while still maintaining an effective throughput rate when a number of dies are used in combination or series along an extruder face.

Figure 7:
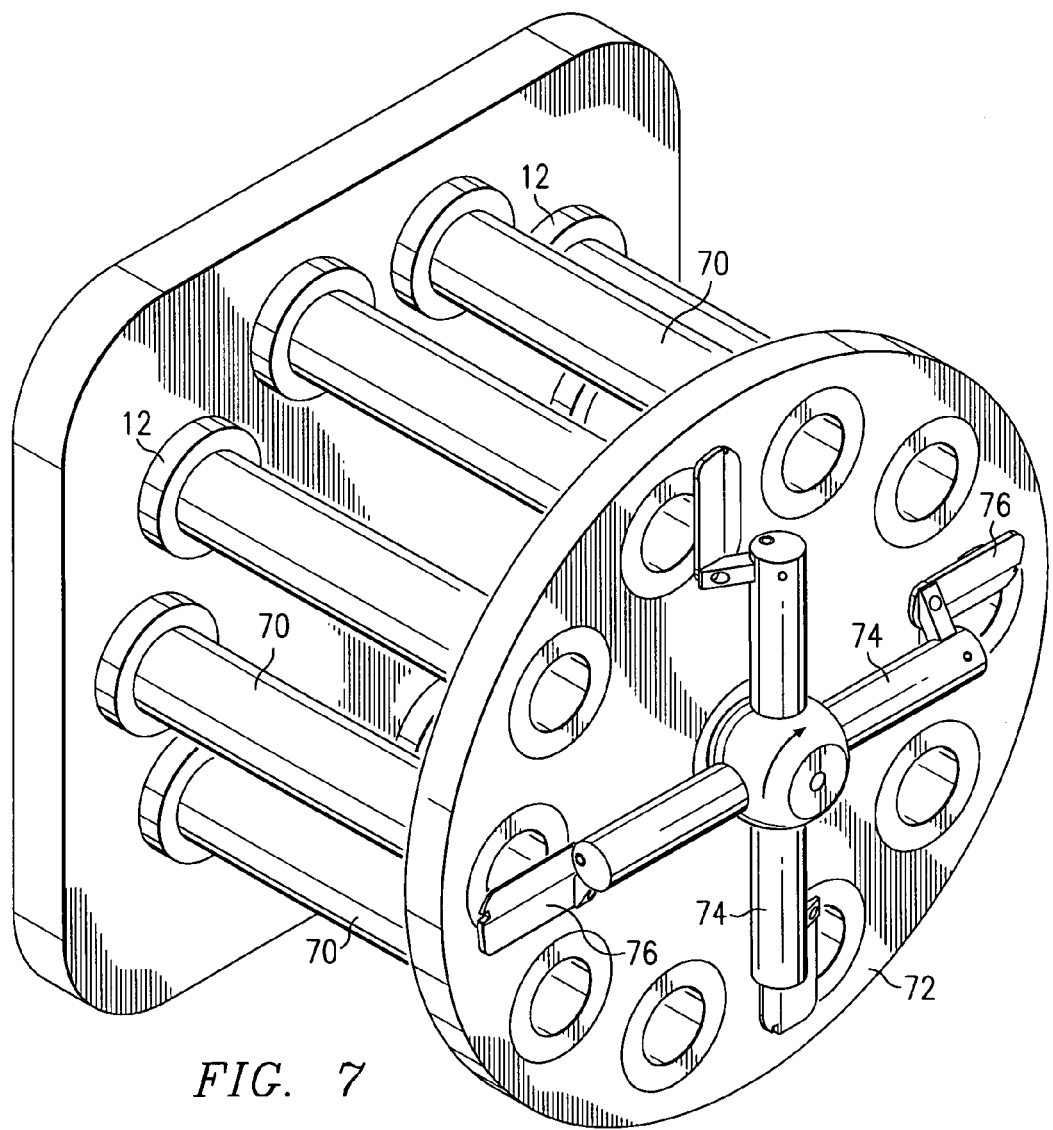
FIG. 7 is a perspective view in elevation of an embodiment of the invention incorporated into a multiple die and circular face cutting arrangement.

FIG. 7 illustrates a perspective view of one embodiment of the invention involving a number of dies 12 in parallel attached to a number of containment tubes 70. The exit end of each containment tube 70 is attached to an extruder face 72. This arrangement then permits the attachment to the extruder face of a circular cutting apparatus 74 having a number of individual cutting blades 76. Such an arrangement is shown with ten individual extruder dies 12 connected to ten containment tubes 70, and permits overall throughput rates through the extruder equal to the throughput rates previously described for prior art puffed rod production using the methods described above.

Although not shown in FIG. 7, the containment tube 70 and extruder face 72 configuration can be designed such that the dies 12 are allowed to vent until specific conditions are met (such as extrudate bulk density, specific mechanical energy, moisture content, screw speed, and die pressure), then the containment tube 70 can be rotated over the dies 12 by means of an additional rotatable plate (not shown) between the tubes 70 and the dies 12.

It should further be understood that more than one die can be routed into a single containment tube. For example, a containment tube can receive the exit extrudate from two nearby die orifices. Further, dies producing any number of shapes, such as a star or square cross section or more complex shapes, such as a cactus or pepper shape, can be used with the invention.

Any number of various types of extruders can be used with the invention, including twin screw and single screw extruders of any length and operating at a wide range of rpm. Further, while the process has been described with regard to a corn-based product, it should be understood that the invention can be used with any puffed extrudate, including products based primarily on wheat, rice, or other typical protein sources or mixes thereof. In fact, the invention could have applications in any field involving extrusion of a material that quickly goes through a glass transition stage after being extruded through a die orifice.

While the invention has been particularly shown and described with reference to a preferred embodiment, it will be understood by those skilled in the art that various changes in form and detail may be made therein without departing from the spirit and scope of the invention.

What is claimed is:

1. A method for producing a spiral shaped puffed extrudate, said extrudate exiting an extruder die in a plastic melt state, moving in a downstream direction, and thereafter cooling to a glass transition state, said method comprising the steps of:
   a) routing the extrudate through a peripheral containment vessel; and
   b) applying a resistance to the extrudate while inside the peripheral containment vessel;

wherein said resistance is applied downstream of the extrudate glass transition point, said resistance is a force directed opposite the downstream direction and hindering the downstream movement of said extrudate, said resistance is sufficient to cause the extrudate to coil within the peripheral containment vessel, and further wherein said resistance is applied to the extrudate by introducing a pressurized gas into the peripheral containment vessel.

2. The method of claim 1 wherein the peripheral containment vessel comprises a tube.

3. The method of claim 1 wherein the peripheral containment vessel is generally axially oriented in relation to the extrudate.

4. The method of claim 1 wherein more than one extrudate is routed through a single peripheral containment vessel.

5. The method of claim 1 further comprising placing a number of extruder dies and corresponding peripheral containment vessels in parallel such that an extruder face can be attached to an exit end of the extruder dies.

6. A method for producing a spiral shaped puffed extrudate, said extrudate exiting an extruder die in a plastic melt state, moving in a downstream direction, and thereafter cooling to a glass transition state, said method comprising the steps of:
   a) routing the extrudate through a peripheral containment vessel; and
   b) applying a resistance to the extrudate while inside the peripheral containment vessel;

wherein said resistance is applied downstream of the extrudate glass transition point, said resistance is a force directed opposite the downstream direction and hindering the downstream movement of said extrudate, said resistance is sufficient to cause the extrudate to coil within the peripheral containment vessel, and further wherein said resistance is applied to the extrudate by a vacuum created within the peripheral containment vessel.

7. The method of claim 6 wherein the peripheral containment vessel comprises a tube.

8. The method of claim 6 further comprising placing a number of extruder dies and corresponding peripheral containment vessels in parallel such that an extruder face can be attached to an exit end of the extruder dies.

9. The method of claim 6 wherein the peripheral containment vessel is generally axially oriented in relation to the extrudate.

10. The method of claim 6 wherein more than one extrudate is routed through a single peripheral containment vessel.

11. A method for producing a spiral shaped puffed extrudate, said extrudate exiting an extruder die in a plastic melt state, moving in a downstream direction, and thereafter cooling to a glass transition state, said method comprising the steps of:
    a) routing the extrudate through a peripheral containment vessel; and
    b) applying a resistance to the extrudate while inside the peripheral containment vessel;

wherein said resistance is applied downstream of the extrudate glass transition point, said resistance is a force directed opposite the downstream direction and hindering the downstream movement of said extrudate, said resistance is sufficient to cause the extrudate to coil within the peripheral containment vessel, and further wherein said resistance is applied to the extrudate by means of a flapper.

12. The method of claim 11 wherein the peripheral containment vessel comprises a tube.

13. The method of claim 11 further comprising placing a number of extruder dies and corresponding peripheral containment vessels in parallel such that an extruder face can be attached to an exit end of the extruder dies.

14. The method of claim 11 wherein the peripheral containment vessel is generally axially oriented in relation to the extrudate.

15. The method of claim 11 wherein more than one extrudate is routed through a single peripheral containment vessel.

* * * * *